United States Patent [19]
Taraki et al.

[11] Patent Number: 5,754,743
[45] Date of Patent: May 19, 1998

[54] APPARATUS AND METHOD FOR PRINTING COLOR SCREEN DISPLAYS ON A MONOCHROME PRINTER

[75] Inventors: Yosuf M. Taraki, Evanston; Robert J. Coleman, Woodstock, both of Ill.

[73] Assignee: Snap-on Technologies, Inc., Lincolnshire, Ill.

[21] Appl. No.: 631,311

[22] Filed: Apr. 10, 1996

[51] Int. Cl.⁶ .................................................. G06K 15/00
[52] U.S. Cl. ............................ 395/109; 358/517; 358/501
[58] Field of Search ...................................... 395/109, 101,
395/110, 134, 131, 800; 358/456, 504,
517, 518, 515, 501, 462, 455, 507, 530,
520; 382/163, 162; 345/149, 114, 22, 150,
153, 186

[56] References Cited

U.S. PATENT DOCUMENTS

| | | | |
|---|---|---|---|
| 4,308,553 | 12/1981 | Roetling | 358/507 |
| 4,703,318 | 10/1987 | Haggerty | 345/114 |
| 4,965,744 | 10/1990 | Wagatsuma et al. | 364/518 |
| 5,003,613 | 3/1991 | Lovelady et al. | 382/163 |
| 5,014,328 | 5/1991 | Rudak | 382/163 |
| 5,153,576 | 10/1992 | Harrington | 340/793 |
| 5,268,992 | 12/1993 | Sasaki | 395/110 |
| 5,271,097 | 12/1993 | Barker et al. | 395/131 |
| 5,280,367 | 1/1994 | Zuniga | 358/462 |
| 5,283,560 | 2/1994 | Bartlett | 345/113 |
| 5,285,296 | 2/1994 | Komooka et al. | 358/518 |
| 5,349,450 | 9/1994 | Yoshioka et al. | 358/500 |
| 5,442,375 | 8/1995 | Wojaczynski et al. | 345/147 |
| 5,442,736 | 8/1995 | Cummins | 395/134 |
| 5,457,772 | 10/1995 | Shannon | 395/109 |
| 5,481,741 | 1/1996 | McKaskle et al. | 395/800 |
| 5,485,288 | 1/1996 | Kamei et al. | 358/530 |
| 5,488,491 | 1/1996 | Steinkirchner | 358/501 |
| 5,515,479 | 5/1996 | Klassen | 395/109 |
| 5,519,815 | 5/1996 | Klassen | 395/109 |
| 5,563,985 | 10/1996 | Klassen et al. | 395/109 |
| 5,649,071 | 7/1997 | Klassen et al. | 395/109 |

*Primary Examiner*—Dwayne Bost
*Assistant Examiner*—Tracy M. Legree
*Attorney, Agent, or Firm*—Emrich & Dithmar

[57] ABSTRACT

A method and apparatus are provided for printing a color computer screen display on a monochrome printer by establishing for the screen display a print filter including a set of filter blocks for controlling the printing of the screen display, wherein each filter block designates a filter realm area on the screen in which the filter block is active and a filter color acted on by the filter block and a filter type instructing the printer to either print or not print pixels which lie within the realm area of the block and have a color which matches the filter color of the block. Plural print filters can be established for a screen display or display components thereof and each print filter is enabled when the associated screen display or display component is displayed on the screen. For any portion of a screen display or display component which lies within overlapping realm areas of different print filters, the last-enabled print filter governs the printing. The system can automatically change a print filter in response to a change in the screen display or display component with which the filter is associated.

18 Claims, 8 Drawing Sheets

APPARATUS AND METHOD FOR PRINTING COLOR SCREEN DISPLAYS ON A MONOCHROME PRINTER

BACKGROUND OF THE INVENTION

1. Field of the Invention

The present invention relates to the conversion of color images to monochromatic images and, in particular, relates to the printing of screen displays of color computer monitor screens with a monochromatic printer.

2. Description of the Prior Art

Many presently available data processing systems are wholly or partially limited to monochromatic imagery, either for cost considerations or because image generation and display is a secondary or later-added capability of the system. Thus, for example, a system may include a color video monitor, such as a CRT monitor, capable of handling color images and yet have a monochromatic printer, which can print only in black and white (assuming black ink is used). Printing a multi-color graphic monitor screen image on a monochrome printer requires that somehow the colors be transformed to black or white prior to printing.

A common approach is to use dithering techniques to represent different colors as various shades of gray. However, such systems can result in distortion of the image, because many combinations of color and shade have the same "gray scale" equivalent. For example, a red area, a blue area and a green area, easily distinguishable in color, may have the same gray equivalent and appear as the same shade of gray in the monochromatic image. Furthermore, the dithering technique used in such systems distorts certain details, such as small text characters.

These prior color transformation approaches also suffer from other disadvantages. One of these is speed of execution, since the dithering technique requires complicated and time-consuming processing of the digitized image data, and the transformation program itself is rather complex and requires a considerable amount of code. Furthermore, since all colors except white get printed, the technique utilizes a considerable amount of print medium, such as ink, print ribbon or the like. Also, the fact that all colors except white are printed increases print time. This increased consumption of time and printing materials is often wasteful, since many of the gray areas printed serve no purpose in the monochromatic image in terms of delivering useful information and, as was indicated above, may even tend to confuse or distort the original color image. This can be quite significant, since these prior gray scale techniques have no way of distinguishing between important (such as text) and unimportant (such as background) portions of a color image, and it may be the most important parts of the image which are distorted in the transformation process.

SUMMARY OF THE INVENTION

It is a general object of the invention to provide an improved apparatus and method for forming monochromatic images from digital representations of color images, which avoids the disadvantages of prior techniques while affording additional structural and operating advantages.

An important feature of the invention is the provision of a method for forming a monochromatic image from a digital representation of a color image by establishing one or more print filters for the color image, which determine whether or not a particular color in a particular area of the image is to be displayed in the monochromatic image.

In connection with the foregoing feature, another feature of the invention is the provision of a method and apparatus of the type set forth for printing color images with a monochrome printer, wherein the print filter of the type set forth essentially determines that a particular color in a particular area of an image is either printed or not printed.

In connection with the foregoing features, another feature of the invention is the provision of a method and apparatus of the type set forth, which enable a print filter when the image with which it is associated is displayed on a color monitor screen and disable it when the image is removed from the screen.

In connection with the foregoing features, a still further feature of the invention is the provision of an apparatus and method of the type set forth, wherein overlapping print filters are prioritized such that the last-enabled filter governs the printing.

Certain ones of these and other features of the invention are attained by providing a method for forming a monochromatic image from a digital representation of a color image, the method comprising the steps of: establishing for the color image a print filter including a set of filter blocks, each of the filter blocks designating a filter realm area of the color image in which the filter block is active and a filter color acted on by the filter block and a filter type indicating whether or not portions of the color image which lie within the realm area of the block and have a color which matches the filter color of the block are to be displayed in the monochromatic image, and displaying the monochromatic image on an output device in accordance with the print filter.

Further features of the invention are attained by providing apparatus for printing color images with a monochrome printer, comprising: a color monitor with a screen having a plurality of pixels arranged in horizontal rows, and processing means coupled to the monitor and operating under stored program control for controlling the display of images on the monitor screen and adapted to be coupled to an associated monochrome printer for controlling printing thereby, the processing means including color control means establishing for a monitor screen display or a display component thereof a print filter including a set of filter blocks and handling the print filter for controlling the printing of color images in the screen display or display component thereof, each of the filter blocks designating a filter realm area on the screen in which the filter block is active and a filter color acted on by the filter block and a filter type instructing an associated printer to either print or not print pixels which lie within the realm area of the block and have a color which matches the filter color of the block, the color control means including installation means responsive to display on the screen of a screen display or display component for enabling any print filter established for the screen display or display component and for correlating such print filter with print filters previously enabled for the screen display, the installation means being responsive to removal of a screen display or display component from the screen for disabling any print filter established for the removed screen display or display component.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
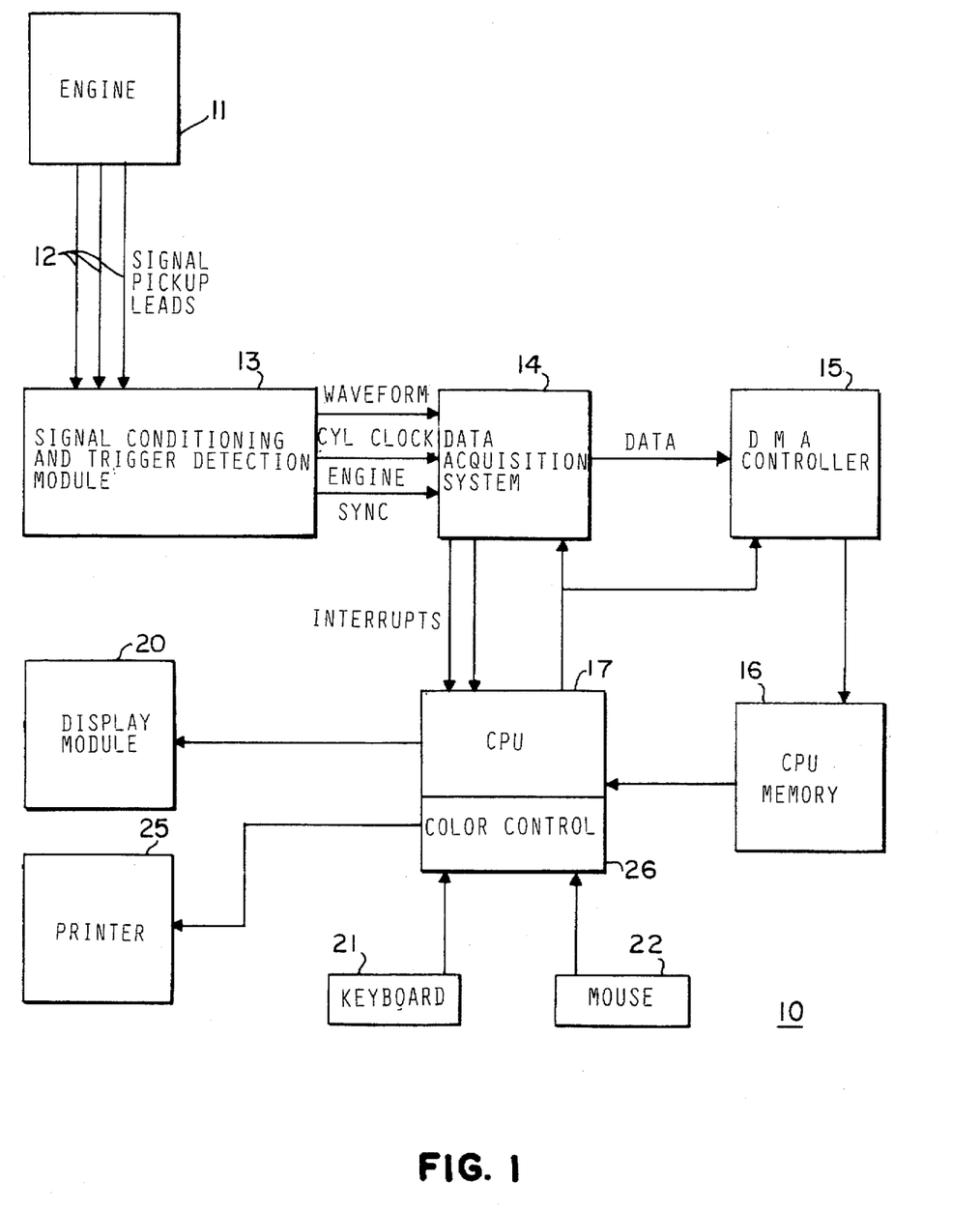
FIG. 1 is a functional block diagram of an engine analyzer system incorporating a color digital oscilloscope display and a monochrome printer with print control in accordance with the present invention.

Referring to FIG. 1, there is illustrated an engine analyzer, generally designated by the numeral 10, in accordance with the present invention. The engine analyzer 10 is adapted for analyzing the operation of an associated multi-cylinder internal combustion engine 11 by, inter alia, monitoring analog waveform signals generated by the engine 11. In this regard, the analyzer 10 is provided with a plurality of signal pickup leads 12 adapted for connection to selected points in the engine 11 for acquiring input signals therefrom. The signal pickup leads 12 are coupled to a signal condition and trigger-detection module 13, which performs preconditioning operations on the input waveform signals and passes the waveform signals to a data acquisition system 14, which digitizes the analog input waveform signals to produce digitized waveform data. The digitized waveform data is passed to a direct memory access (DMA) controller 15, which controls its storage in a CPU memory 16.

The analyzer 10 also includes a central processing unit (CPU) 17 which is coupled to each of the data acquisition system 14, the DMA controller 15 and the memory 16, as well as to a display module 20. The CPU 17 controls the operation of the data acquisition system 15 and the DMA controller 16 and also controls transfer of stored waveform data from the memory 17 to the display module 20, and also controls the various operational modes of the display module 20. In this regard, the display module 20 is preferably a digital color graphical screen display similar to a digital color monitor for a computer. The analyzer 10 also includes a user interface which may include a keyboard 21 and/or a mouse 22, which are coupled to the CPU 17.

Analyzer 10 further includes a monochrome printer 25 which is coupled to the CPU 17 and is controlled, in part, thereby. In this regard, the CPU 17 includes a color control function 26 in accordance with the present invention for controlling the printing by the printer 25 of color screen displays on the display module 20, as will be explained more fully below.

The color control function 26 of the present invention converts a color screen display of the display module 20 to a monochrome or black and white (assuming that the printer 25 uses black ink) display image which can be printed on the printer 25. The essence of the invention is that it essentially establishes for each color screen display of the display module 20, or display component thereof, a print filter, wherein the word "filter" is herein used to signify a set of commands or instructions which will be utilized by the printer driver program for controlling the printing of the screen display by the printer 25. Each print filter includes a plurality of filter "blocks", wherein a block is an instruction which relates to a particular color in a particular rectangular area of the display module screen and determines whether that color in that area will or will not be printed by the printer 25. Thus, with the present invention, by establishing the print filter for the screen display, individual features of the display are either printed or not printed, and this decision can be made on the basis of the importance or significance of the feature. No attempt is made to distinguish in the printout between different colors or different shades of color. Thus, there are no half tones or gray scales involved in the present invention.

The screen of the display module 20 comprises a plurality of pixels arranged in horizontal rows, in a known manner. The present invention is described herein in connection with a display screen having a width of 640 pixels and a height of 350 pixels, but it will be appreciated that the principles of the present invention apply equally well to other size screens. The print filter mechanism of the present invention is based on the assumption that, for each pixel on the display screen of the display module 20, there is a corresponding printable dot on the paper imprinted by the printer 25. The invention provides a means for determining which pixels are printed and which pixels are not printed. The display screen's coordinates are given as x=0, y=0 at the upper left corner of the screen and x=639, y=349 at the lower right corner of the screen.

Print filters are installed by application programs that draw graphic objects or other images on the screen in order to inform the printer driver program how to convert the different colors on the screen to black and white on the paper. Each print filter consists of a set of filter blocks. Each filter block designates a rectangular area on the screen in which a given color is declared as either printable or non-printable. The filter block is a data structure with the following fields:

Filter Realm—This defines a rectangular region on the screen.

Filter Color—The filter block acts on this color.

Filter Type—Filter type is either PRINT COLOR or IGNORE COLOR.

The Filter Realm field defines a rectangular area on the screen in which the filter block is active. Filter Realm is specified as (y1, y2, x1, x2) where y1, y2 specify the upper and lower limits and x1, x2 specify the left and right limits of the rectangle. Filter Color is the color which activates the filter block. Filter Type can assume one of two values (PRINT COLOR or IGNORE COLOR) indicating whether pixels that lie within the Filter Realm and have a color which matches the Filter Color are to be printed or ignored. A print filter can have several filter blocks affecting several colors in one or more realms on the screen.

Print filters can be created statically at compile time or they can be created dynamically by the program at run time. A print filter is not activated or enabled until it is installed. A filter is installed by adding it to the print filter chain, which is a linked list of all the currently active filters relating to a particular screen display. When the filter is no longer needed, it is removed from the filter chain. For example, when the system message routine displays a message on the screen, it installs a print filter for that message. When the message is removed from the screen, the corresponding print filter is uninstalled or disabled.

Pressing the Print Screen key on the keyboard 21 activates the printer driver program which prints the current screen display image in the manner described below. The term "screen display" is used herein to mean the entirety of what appears on the screen of the display module 20, whereas the term "display component" is used to refer to some portion of the screen display. Examples of these terms in connection with specific screen displays will be given below.

Figure 2:
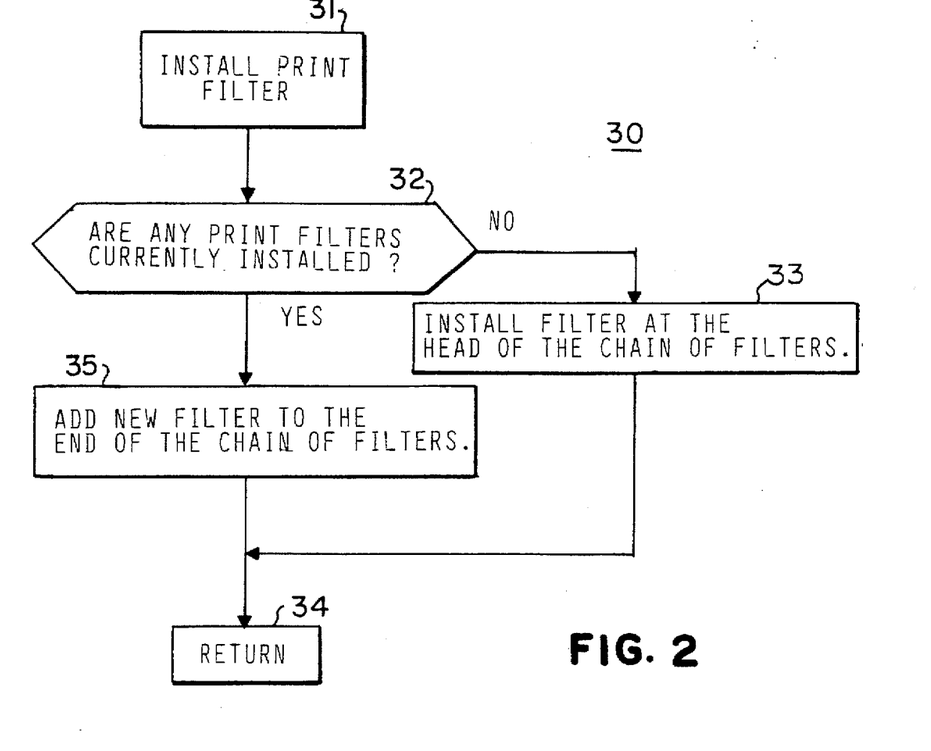
FIGS. 2–6 are flow chart diagrams of a software program of the engine analyzer of FIG. 1 for controlling the printing of color images on the monochrome printer.

Referring now to FIGS. 2–6, there are illustrated flow diagrams of a software program for installing a print filter and printing a display screen in accordance with the features of the present invention. FIG. 2 illustrates an Install Print Filter routine generally designated 30. The routine is entered at 31 when a particular screen display or display component thereof is displayed on the screen of the display module 20. The program first checks at 32 to see if there are any print filters currently installed relating to this screen display. If not, the program installs the filter for the currently-added screen display or a display component at the head of the filter chain, and then returns at 34. If there are print filters currently installed at 32, the program then adds the new filter at 35 to the end of the chain of filters, and then returns.

Figure 3:
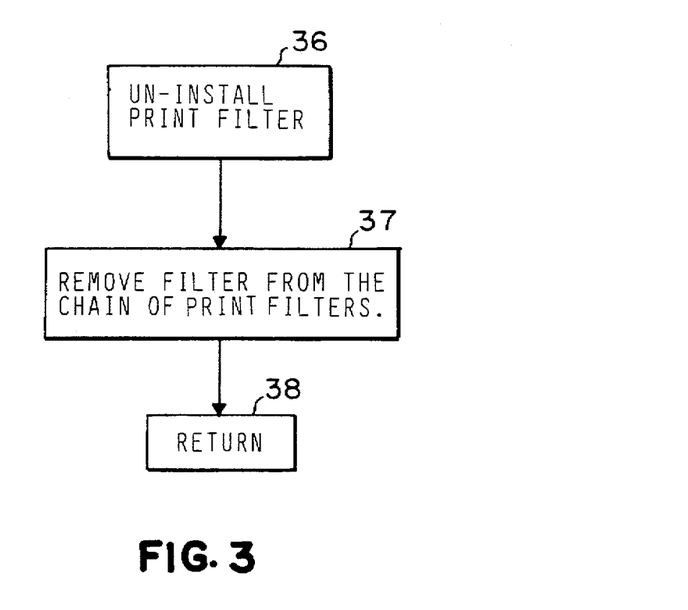

FIG. 3 discloses an Un-install Print Filter routine 36, which is called whenever a screen display or display component with which a filter is associated is removed form the screen. At this point, the routine at 37 removes the filter from the chain of print filters and then returns at 38.

Figure 4:
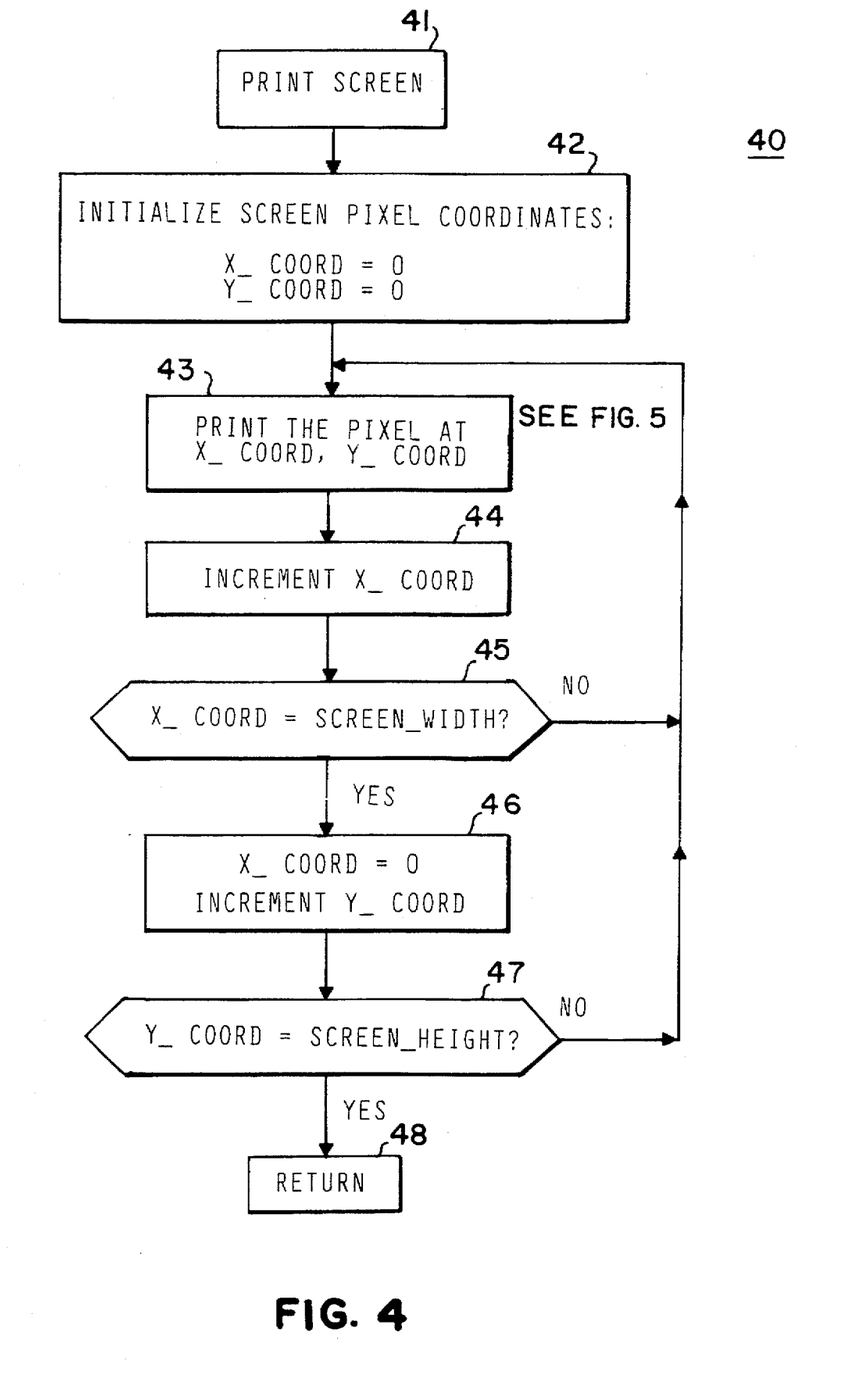

In FIG., 4 there is illustrated a Print Screen routine 40 for printing the screen display of the module 20 by the printer 25 in accordance with any print filters which may be installed with respect to that screen display. The program is entered at 41 when the Print Screen key on the keyboard 21 is pressed and then, at 42, the routine initializes the screen pixel coordinates, setting each of the X and Y coordinates to zero, so that the print routine will start with the pixel at the upper left-hand corner of the screen. Essentially, the routine will examine each pixel of the screen and determine if the pixel is to be printed or ignored. If the pixel is declared printable, the routine instructs the printer to place a dot at the corresponding location on the paper, otherwise it does not.

Thus, at 43 the routine next prints the pixel at the X, Y coordinates in accordance with a Print One Pixel subroutine, which will be described below in connection with FIG. 5. Then, at 44, the routine increments the X coordinate by one pixel, checks at 45 to see if the X coordinate is equal the screen width (i.e., 640 in this case) and, if not, returns to block 43 to print the next pixel. The program continues in this manner across the width of the screen in the first row of pixels.

If, at 45, the X coordinate is equal to the screen width, so that the right-hand edge of the screen has been reached, the program then, at 46, sets the X coordinate to zero, moving back to the left-hand edge of the screen, and increments the Y coordinate one pixel, moving down to the next row of pixels, and then checks at 47 to see if the Y coordinate is equal to the screen height (350 in this case). If not, it returns to block 43 and prints the pixel and continues back down the loop, printing each pixel on the row, and then indexing to the next row and so on. If, at 47, the Y coordinate is equal to the screen height, the program returns at 48.

Figure 5:
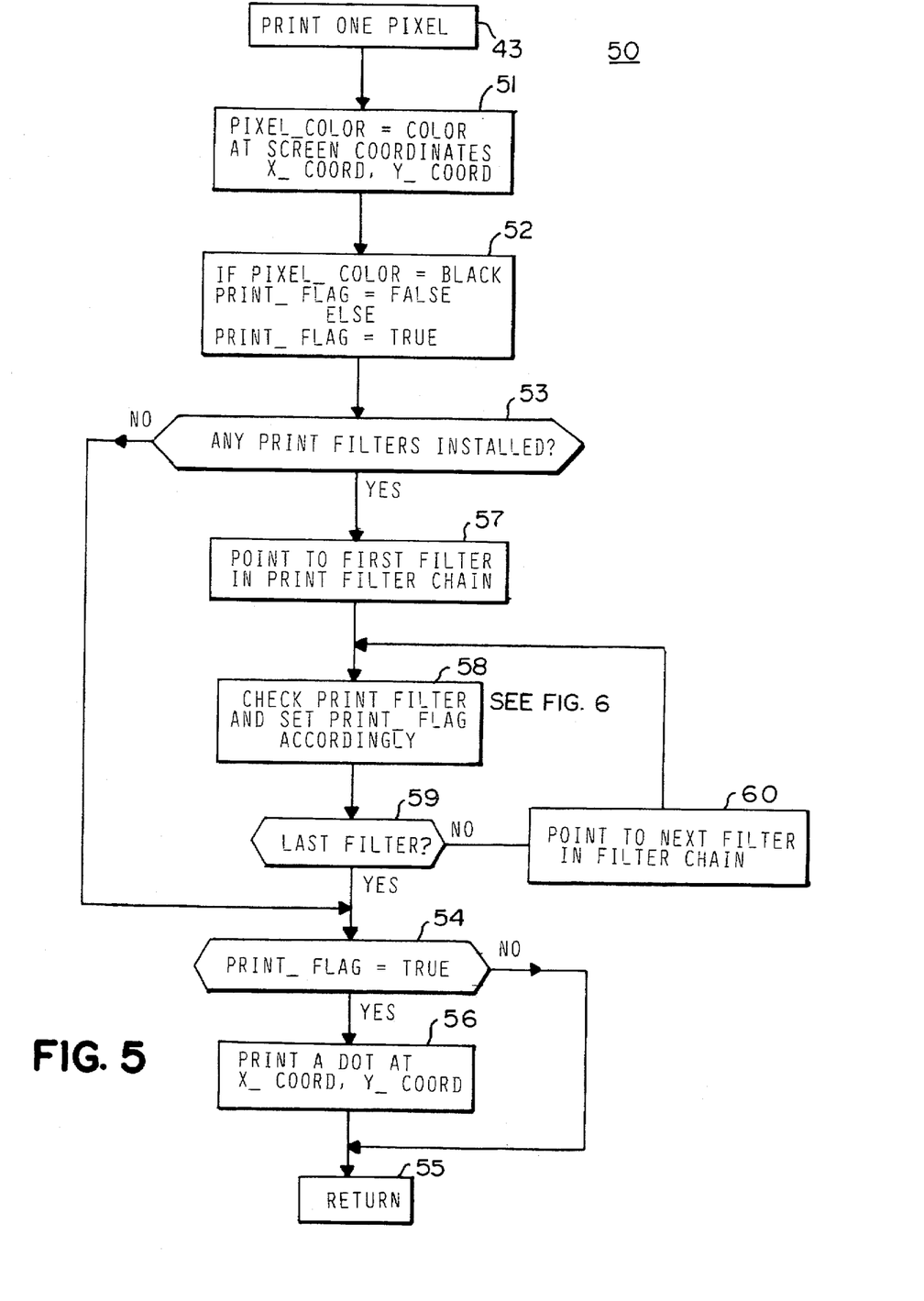

Referring now to FIG. 5, the Print One Pixel routine, which is called at 43 in FIG. 5, is designated 50. The program first, at 51, defines Pixel Color as equal to the color at the X, Y screen coordinates for the pixel currently being printed. Then, at 52, the program sets default conditions, such that if Pixel Color is black a print flag is set to FALSE, meaning the pixel is not to be printed, otherwise the print flag is set to TRUE, meaning that the pixel is to be printed. Thus, if there are no print filters installed for the screen display, the black areas of the screen will not be printed and all other areas of the screen, irrespective of color, will be printed.

Next, the program scans through any installed filters to determine whether or not they alter the default condition for this particular pixel. Thus, at 53 the program checks to see if there are any print filters installed. If not, the program drops to check at 54 to see if the print flag is currently TRUE. If it is not, the program returns at 55. If the print flag is TRUE, a dot is printed at the X, Y coordinates on the paper corresponding to those of the currently-printed pixel on the screen. If, at 53, there are print filters installed, the program, at 57, points to the first filter in the print filter chain, i.e., the earliest-installed filter and then, at 58, it checks that print filter by executing a subroutine described below in connection with FIG. 6, and sets the print flag accordingly. Then, at 59, the program checks to see if this is the last filter in the chain. If not, the program at 60 points to the next filter in the chain and returns to block 58 to check that filter. If, at 59, the filter being checked is the last one in the chain, the program drops to 54 to check the condition of the flag. If it is TRUE it prints the dot at the current X, Y coordinates and if not, returns.

It will be noted that if there is more than one filter installed with respect to a particular pixel, successive filters may set the print flag to opposite states. In this case, since the filters are chained in the order in which they are installed, in the case of overlapping filters the last filter installed will override the previous filters.

Figure 6:
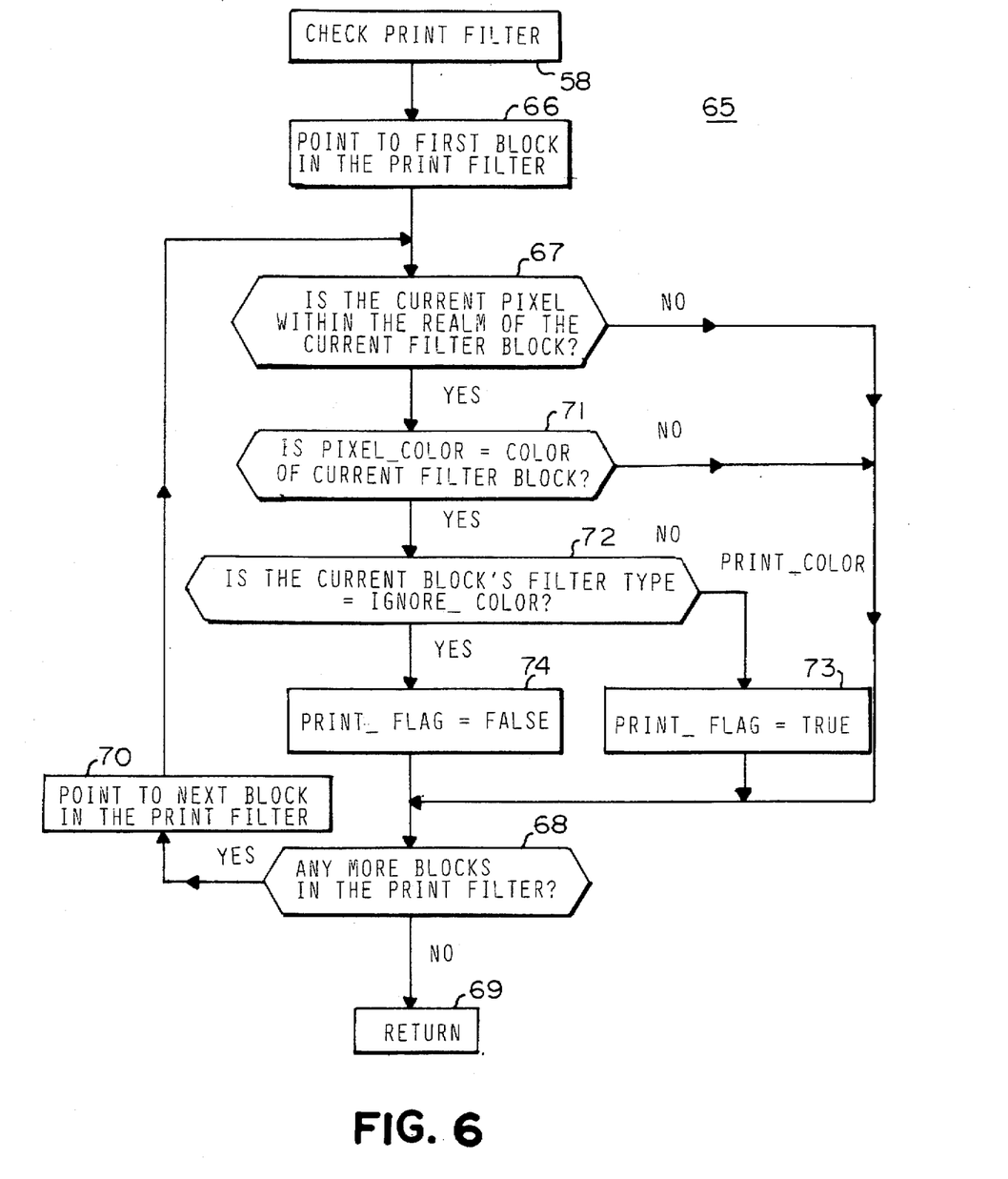

Each print filter is checked by the Check Print Filter subroutine designated 65 in FIG. 6. As was indicated above, this subroutine is entered at 58 from the FIG. 5 routine and, at 66, it first points to the first block in the print filter and then, at 67, checks to see if the current pixel is within the realm of the current filter block. If it is not, the program drops to decision 68 to see if there are any more blocks in this print filter. If not, the program returns at 69 to the routine of FIG. 5 and, if so, the program at 70 points to the next block in the print filter and then returns to decision 67. If, at 67, the current pixel is in the realm of the current filter block, the program next checks at 71 to see if the Pixel Color is the same as the Filter Color for the current filter block. If not, the program again drops to decision 68 to check to see if there are any more blocks and, if so, the program next checks at 72 to see if the Filter Type of the current filter block is IGNORE COLOR. If not, this means that it must be PRINT COLOR and, accordingly, the program at 73 sets the print flag to TRUE and then returns to decision 68 to check for other filter blocks. If, at 72, the filter block type is IGNORE COLOR, the program at 74 sets the print flag to FALSE before moving to decision 68.

Thus, it can be seen that the Check Print Filter subroutine checks the current pixel against each of the filter blocks in the current print filter. A given filter block will act on a pixel if the pixel is within its realm and if the color of the pixel matches the Filter Color. If these two conditions are met, the filter block will act on the pixel by setting the print flag in accordance with the Filter Type field. In this way a filter block can declare a given pixel as either printable or non-printable.

Figure 7:
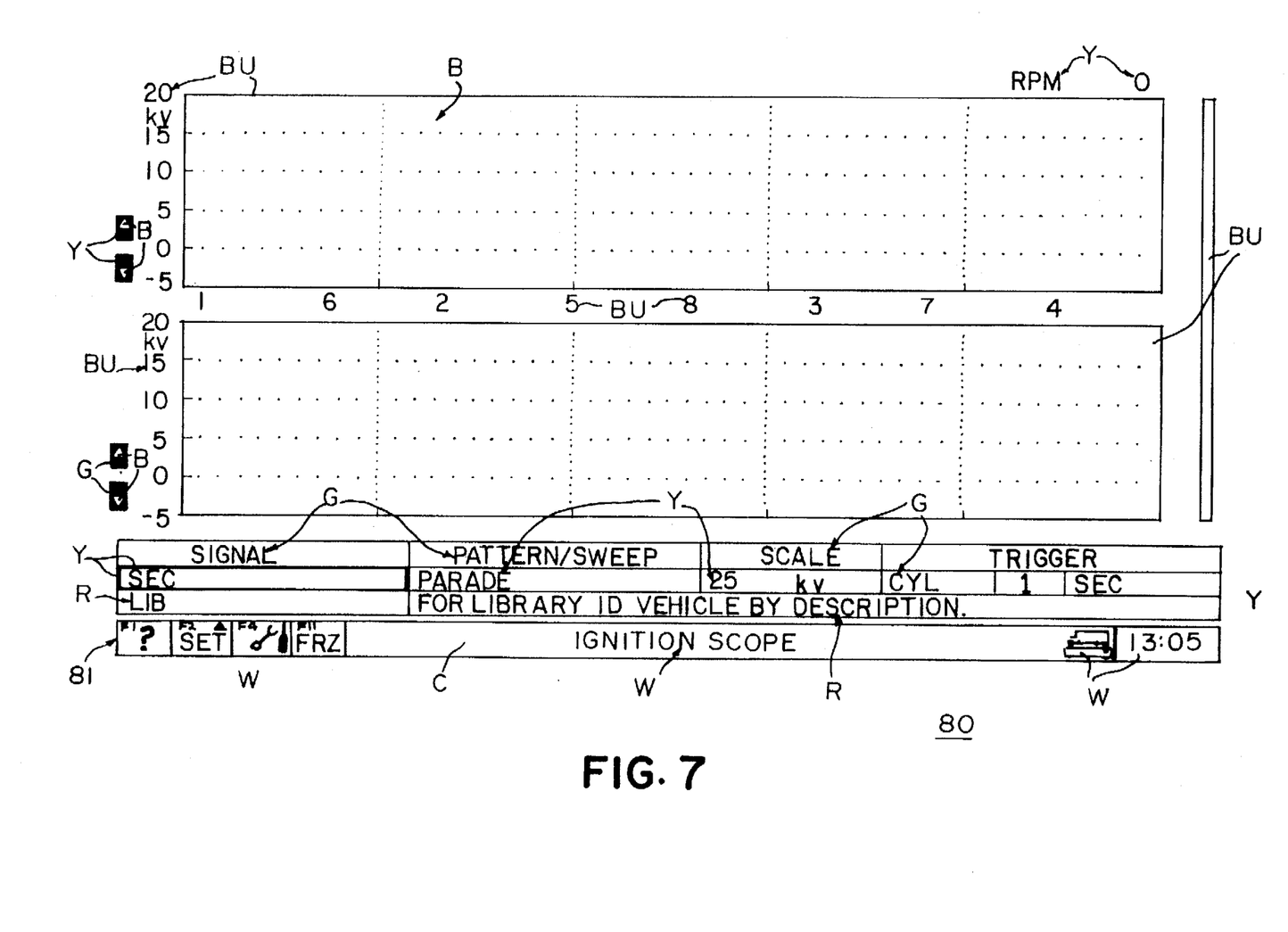
FIGS. 7–9 are printouts on the monochrome printer of the engine analyzer of FIG. 1 of color screen displays on the display module of that analyzer.

Referring now to FIG. 7, there is illustrated a printout generated by the printer 25, of a color screen display generally designated 80, on the display module 20. As is readily apparent, there are no shades of gray in this printout. All images in the screen display appear as either black or white. The colors in the original color screen display are indicated by letters corresponding to the colors. The entire background of the screen display, with the exception of the horizontal row of boxes 81 at the bottom of the screen, was initially black, as designated by the letter B. Also, the arrows at the left-hand side of the screen were initially black. These areas all appear white in the printout in accordance with the default conditions set by the Print One Pixel subroutine, described above in connection with FIG. 5. The outlines for the two waveform trace or plot areas, the dotted grid lines in those areas, the narrow vertical box at the right-hand side of the screen, the scale indicia along the left-hand side of the screen and the cylinder indicia under the upper trace area were all initially blue in the screen display, as designated by the letter BU. The rectangular outlines around the upper set of arrows, the RPM designation at the upper right-hand corner of the screen, the heavy outline around the left-hand box "Sec", as well as those letters and the words "Parade", "25 kv" and "Sec" in the right-hand box, were initially in yellow, as designated by the letter Y. The words "Lib" and "For Library, ID vehicle by description" were initially red, as designated by the letter R. The rectangular outlines around the lower set of arrows, and the outlines around all of the other boxes at the bottom of the screen were initially gray, as designated by the letter G, as were the words "Signal", "Pattern/Sweep", "Scale", "Trigger" and "Cyl 1". All of these purple, yellow, red and gray areas are printed in the printout in accordance with the default conditions.

The bottommost row 81 of boxes includes white characters, designated by the letter W against a cyan background, designated C. The white characters are printed in accordance with the default conditions, described above. However, the cyan background must not be printed, otherwise the characters could not be seen. Thus, a print filter is established to instruct that this cyan background not be printed. In this regard, it is noted that print filter blocks can be created using the following macro or subroutine calls, for purposes of illustration:

| | |
|---|---|
| IGNORE (color, y1, y2, x1, x2) | generate a filter block to ignore a given color. y1, y2, x1, x2 define the realm of the filter block |
| PRINT (color, y1, y2, x1, x2) | generate a filter block to print a given color. y1, y2, x1, x2 define the realm of the filter block |

Thus, the print filter for the printout of FIG. 7 is:

(1) IGNORE (CYAN, 328, 349, 0, 639)
    IGNORE (GREY, 328, 349, 0, 639).

The coordinates define the area of the bottommost row 81 of boxes, i.e., the Filter Realm for this two-block filter. The words "CYAN" and "GREY" are the Filter Color for the two blocks and the word "IGNORE" defines the Filter Type for each block. The grey block is necessary because some of the boxes sometimes have a grey background, as will be seen below in connection with FIG. 8.

Figure 8:
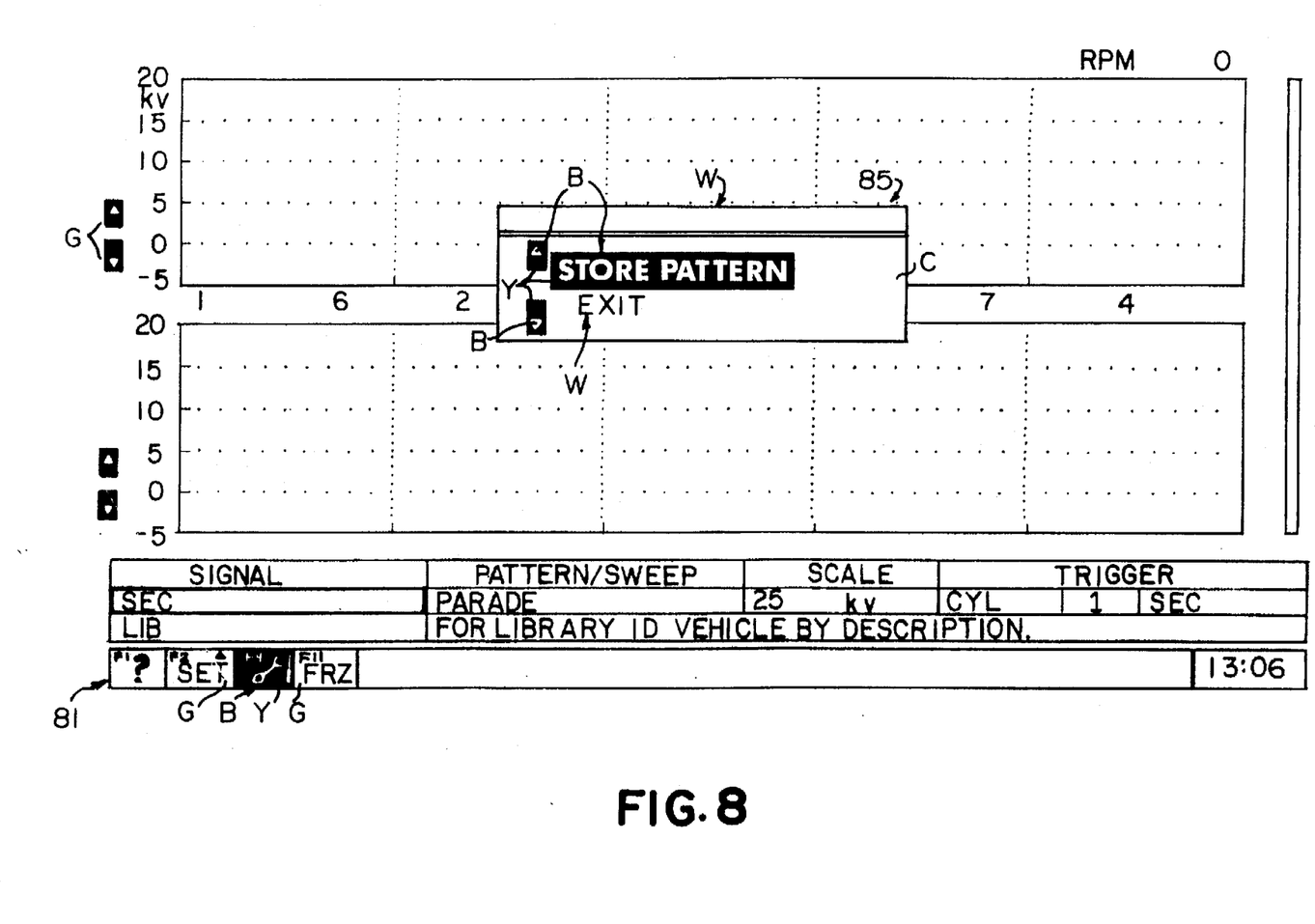

Referring now to FIG. 8, there is a modified form of the printout of FIG. 7, wherein there has been added to the screen display a menu box 85 which is superimposed on top of a central portion of the original screen display. The overall background of the menu box 85 was originally cyan, as designated by C. The words "TOOLS" and "EXIT" were initially white, the words "STORE PATTERN" and the two arrows were initially black, as designated by the letter B, and the rectangular backgrounds for these characters were initially yellow, as designated by the letter Y. When the program of the analyzer 10 displays the menu box 85, it also installs or enables a print filter associated with this menu box, which box constitutes a display component of the overall screen display. Since the menu box 85 is displayed subsequent to the initial display of FIG. 7, its print filter is chained to the first print filter, described above, so that it forms the last filter in the chain. This new print filter is:

(2) IGNORE (CYAN, 98, 294, 168, 520).

This one-block filter ignores the cyan background of the new menu box 85. All of the other characters in the menu box appear black or white in accordance with the default conditions.

Note that, in this case, the screen display of the bottom row of boxes 81 has also changed from FIG. 7. More specifically, the backgrounds of the second and fourth boxes had become gray, and the background of the third box had become yellow, while the characters in the yellow box had become black. These elements are all printed in accordance with the default conditions as modified by the print filter (1), defined above.

Figure 9:
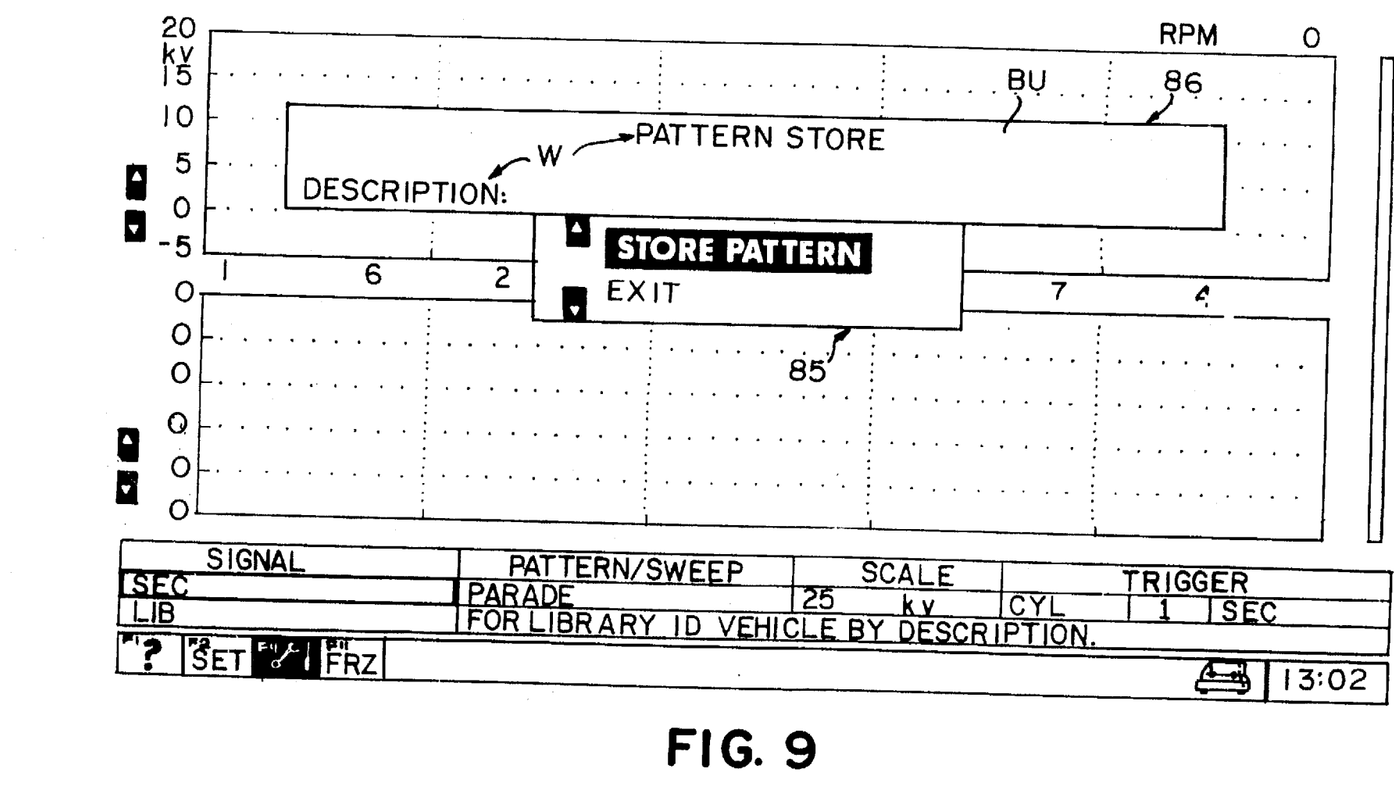

Referring now to FIG. 9, there is illustrated a further modified version of the printout of FIG. 8. In this case, there was added to the screen display an additional dialog box 86 overlapping the upper part of the menu box 85. This new box 86 contained white characters on a blue background, designated BU. This is a different shade from the cyan color so that it can be distinguished from the box 85, which it overlaps. The white characters are printed in accordance with the default conditions, described above. However, again, in order for them to be seen, the blue background must not be printed. Therefore, when the box 86 is displayed on the screen, there is installed a single-block print filter associated with it as follows:

(3) IGNORE (BLUE, 65, 117, 80, 552).

This block filters the blue background of the dialog box 86.

Note that, in each of FIGS. 7–9, the white characters could have been distinguished from the blue or cyan backgrounds by installing print filters which ignored white, allowing the backgrounds to print in accordance with the default conditions. There would have resulted a white on black display, similar to the display of the words "STORE PATTERN" in FIG. 9. However, this would have required more pixels to be printed, utilizing more ink and taking more time. The "STORE PATTERN" image in FIG. 9 is allowed to print in accordance with the default conditions, in order to show the highlighted condition.

Also, in each of FIGS. 7, 8 and 9, the borders around the boxes 85 and 86 and the row of boxes 81 are shown in black on the printouts because each of these boxes in the original screen display has a 1-pixel near-black border surrounding it, which is added for printing purposes.

From the foregoing it can be seen that there has been provided an improved apparatus and method for converting a color screen display to a monochrome display printable with a monochrome printer, by means of establishing print filters which, for a particular color in a particular area of the screen, controls whether or not the color is printed, thereby resulting in a monochrome printout which is relatively distortion-free and which utilizes the printer in an efficient manner.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for printing on a monochrome printer images displayed in color, comprising:

a color monitor with a screen having a plurality of pixels arranged in horizontal rows, and processing means coupled to said monitor and operating under stored program control for controlling the display of images on the monitor screen and adapted to be coupled to an associated monochrome printer for controlling printing thereby, said processing means including color control means establishing for a monitor screen display a print filter including a set of filter blocks and handling the print filter for controlling the printing of color images in the screen display, each of said filter blocks designating a variable-size filter realm area on the screen in which the filter block is active and a filter color acted on by the filter block and a filter type instructing an associated printer to either print all pixels or not print all pixels which lie within the realm area of the block and have a color which matches the filter color of the block.

2. The apparatus of claim 1, wherein said color control means includes means for enabling the print filter when the screen display is displayed.

3. The apparatus of claim 1, wherein said color control means includes means for automatically modifying the print filter in response to a change in the screen display.

4. The apparatus of claim 1, wherein said filter realm area is rectangular in shape.

5. The apparatus of claim 1, wherein said color control means includes means for establishing for the screen display a plurality of print filters each including a set of filter blocks.

6. The apparatus of claim 1, wherein said color control means includes means establishing a default condition for any area of a screen display not governed by a print filter such that the area is not printed if it is black and is printed if it is any other color.

7. Apparatus for printing on a monochrome printer images displayed in color, comprising;

a color monitor with a screen having a plurality of pixels arranged in horizontal rows, and processing means coupled to said monitor and operating under stored program control for controlling the display of images on the monitor screen and adapted to be coupled to an associated monochrome printer for controlling printing thereby, said processing means including color control means establishing for a monitor screen display or a display component thereof a print filter including a set of filter blocks and handling the print filter for controlling the printing of color images in the screen display or display component thereof, each of said filter blocks designating a variable-size filter realm area on the screen in which the filter block is active and a filter color acted on by the filter block and a filter type instructing an associated printer to either print all pixels or not print all pixels which lie within the realm area of the block and have a color which matches the filter color of the block, said color control means including installation means responsive to display on the screen of a screen display or display component for enabling any print filter established for the screen display or display component and for correlating such print filter with print filters previously enabled for the screen display, said installation means being responsive to removal of a screen display or display component from the screen for disabling any print filter established for the removed screen display or display component.

8. The apparatus of claim 7, wherein said color control means includes means for ordering said print filters such that the last-enabled print filter supersedes all previously-enabled print filters for any portion of a screen display or display component which lies within overlapping filter realm areas of different print filters.

9. The apparatus of claim 7, wherein said color control means includes means for automatically modifying the print filter in response to a change in the screen display.

10. The apparatus of claim 7, wherein said filter realm area is rectangular in shape.

11. The apparatus of claim 7, wherein said color control means includes means establishing a default condition for any area of a screen display not governed by a print filter such that the area is not printed if it is black and is printed if it is any other color.

12. A method for forming a monochromatic image from a digital representation of a color image, said method comprising the steps of:

establishing for the color image a print filter including a set of filter blocks, each of said filter blocks designating a variable-size filter realm area of the color image in which the filter block is active and a filter color acted on by the filter block and a filter type indicating whether or not all portions of the color image which lie within the realm area of the block and have a color which matches the filter color of the block are to be displayed in the monochromatic image, and displaying the monochromatic image on an output device in accordance with the print filter.

13. The method of claim 12, and including the step of establishing for the color image a plurality of print filters each including a set of filter blocks.

14. The method of claim 13, and further comprising the step of ordering the print filters such that the last-established print filter supersedes previously established print filters for any portion of the color image which lies in overlapping filter realm areas of different print filters.

15. The method of claim 12, and further comprising the step of establishing a default condition such that for any area of a screen display not governed by a print filter the area is not printed if it is black and is printed if it is any other color.

16. The method of claim 12, and further comprising the step of displaying the color image on a color monitor screen of a computer.

17. The method of claim 12, wherein the output device is a monochrome printer.

18. Apparatus for forming a monochromatic image from a digital representation of a color image, said apparatus comprising:

- a source for providing a digital representation of a color image,
- a processor coupled to said source and operating under stored program control and including color control means for establishing for the color image a print filter including a set of filter blocks,
- each of said filter blocks designating a variable-size filter realm area of the color image in which the filter block is active and a filter color acted on by the filter block and a filter type indicating whether or not all portions of the color image which lie within the realm area of the block and have a color which matches the filter color of the block are to be displayed in the monochromatic image, and
- an output device coupled to said processor for producing a visible representation of the monochromatic image in accordance with the print filter.

* * * * *